(12) United States Patent
Bhooma (10) Patent No.: US 8,085,934 B1
(45) Date of Patent: Dec. 27, 2011

(54) REVERSE CRYPTOGRAPHIC KEY EXPANSION

(75) Inventor: Pranab Bhooma, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 768 days.

(21) Appl. No.: 12/169,044

(22) Filed: Jul. 8, 2008

Related U.S. Application Data (60) Provisional application No. 60/949,128, filed on Jul. 11, 2007.

(51) Int. Cl.
*H04L 9/00* (2006.01)
(52) U.S. Cl. .......................................... 380/44; 380/28
(58) Field of Classification Search ............... 380/28, 380/44
See application file for complete search history.

(56) References Cited

U.S. PATENT DOCUMENTS

| | | | |
|---|---|---|---|
| 7,295,671 B2 * | 11/2007 | Snell | 380/28 |
| 2003/0223580 A1 * | 12/2003 | Snell | 380/28 |
| 2005/0213756 A1 * | 9/2005 | Hubert | 380/44 |
| 2008/0019504 A1 * | 1/2008 | Han et al. | 380/28 |

OTHER PUBLICATIONS

Federal Information Processing Standards Publication 197; Nov. 26, 2001; Announcing the Advanced Encryption Standard (AES); 51 pages.

* cited by examiner

*Primary Examiner* — Benjamin Lanier
*Assistant Examiner* — Cordelia Zecher (57) ABSTRACT

Apparatus having corresponding methods and computer programs comprise: a key input module to receive a first cryptographic key; and a reverse key expansion module to generate a second cryptographic key based on the first cryptographic key, wherein each of the first cryptographic key and the second cryptographic key comprises a plurality of words, and wherein the reverse key expansion module comprises a first word module to generate the first word of the second cryptographic key based on the first word of the first cryptographic key and the last two words of the first cryptographic key, and a remaining word module to generate the remaining words of the second cryptographic key, the remaining word module comprising at least one word module to generate a word of the second cryptographic key based on the corresponding word, and the immediately previous word, of the first cryptographic key.

24 Claims, 8 Drawing Sheets

REVERSE CRYPTOGRAPHIC KEY EXPANSION

CROSS-REFERENCE TO RELATED APPLICATIONS

This application claims the benefit of U.S. Provisional Patent Application Ser. No. 60/949,128, filed on Jul. 11, 2007, the disclosure thereof incorporated by reference herein in its entirety.

BACKGROUND

The present invention relates generally to cryptography. More particularly, the present invention relates to expansion of cryptographic keys.

In the Advanced Encryption System (AES), encryption of plaintext into ciphertext proceeds in several iterations, referred to as "rounds." Each round employs one of several cryptographic keys, referred to as "round keys," that result from key expansion of a shared cryptographic key referred to as a "cipher key." AES specifies three different key lengths, each using a different number of rounds, and therefore, round keys, as shown in Table 1. Referring to Table 1, while the length Nb of the plaintext is always four 32-bit words, the key length Nk and number of rounds Nr can vary, as can the number of round keys Nr+1, which includes the cipher key and a round key for each of the Nr rounds.

TABLE 1

|  | Key Length (Nk words) | Block Size (Nb words) | Number of Rounds (Nr) |
| --- | --- | --- | --- |
| AES-128 | 4 | 4 | 10 |
| AES-192 | 6 | 4 | 12 |
| AES-256 | 8 | 4 | 14 |

To encrypt plaintext, the cipher key is expanded to obtain the Nr round keys using a key expansion technique specified by the AES standard. According to key expansion, the initial round key is simply the cipher key. The second round key is derived from the initial round key. The third round key is derived from the second round key, and so on. In the initial round, the initial round key is applied to a block of Nb words of the plaintext. In each subsequent round, the corresponding round key is applied to an intermediate result referred to as the "state." At the completion of the rounds, the state is a block of Nb words of ciphertext.

To decrypt the ciphertext, the process is reversed using the same round keys. That is, the final round key is used in the first round of decryption, and the initial round key is used in the last round. However, the AES standard does not provide a reverse key expansion technique. That is, the AES standard does not provide a technique for deriving the round key for a decryption round from the round key of the previous decryption round. Therefore, conventional AES cryptographic schemes store all of the round keys generated during key expansion for use during decryption. One disadvantage of this approach is the cost of the memory required to store the round keys. For example, for AES-256, the 15 round keys, each comprising eight 32-bit words, require 480 bytes of memory.

SUMMARY

In general, in one aspect, an embodiment features an apparatus comprising: a key input module to receive a first cryptographic key; and a reverse key expansion module to generate a second cryptographic key based on the first cryptographic key, wherein each of the first cryptographic key and the second cryptographic key comprises a plurality of words, and wherein the reverse key expansion module comprises a first word module to generate the first word of the second cryptographic key based on the first word of the first cryptographic key and the last two words of the first cryptographic key, and a remaining word module to generate the remaining words of the second cryptographic key, the remaining word module comprising at least one word module to generate a word of the second cryptographic key based on the corresponding word, and the immediately previous word, of the first cryptographic key.

Embodiments of the apparatus can include one or more of the following features. In some embodiments, the at least one word module comprises: a substitution module to generate an S-box substitution of the word immediately previous to the corresponding word of the first cryptographic key; and a first exclusive-OR module to generate an exclusive-OR of the S-box substitution and the corresponding word of the first cryptographic key. In some embodiments, the at least one word module comprises: a first exclusive-OR module to generate an exclusive-OR of the corresponding word, and the immediately previous word, of the first cryptographic key. In some embodiments, the first word module comprises: a second exclusive-OR module to generate an exclusive-OR of the last two words of the first cryptographic key; a transform module to generate a transform of the exclusive-OR of the last two words of the first cryptographic key; and a third exclusive-OR module to generate an exclusive-OR of the transform and the last word of the first cryptographic key. In some embodiments, the transform module comprises: a rotation module to generate a rotation of the exclusive-OR of the last two words of the first cryptographic key; a substitution module to generate an S-box substitution of the rotation; and a fourth exclusive-OR module to generate an exclusive-OR of the S-box substitution and a constant. In some embodiments, the rotation, S-box substitution, and constant are in compliance with the Advanced Encryption Standard (AES). Some embodiments comprise a decryption module to decrypt ciphertext based on the first cryptographic key and the second cryptographic key. In some embodiments, the decryption module comprises: a state module to generate a second state of the ciphertext based on a first state of the ciphertext and the first cryptographic key, and to generate a third state of the ciphertext based on the second state of the ciphertext and the second cryptographic key. In some embodiments, generating the second cryptographic key occurs after generating the second state of the ciphertext.

In general, in one aspect, an embodiment features an apparatus comprising: key input means for receiving a first cryptographic key; and reverse key expansion means for generating a second cryptographic key based on the first cryptographic key, wherein each of the first cryptographic key and the second cryptographic key comprises a plurality of words, and wherein the reverse key expansion means comprises first word means for generating the first word of the second cryptographic key based on the first word of the first cryptographic key and the last two words of the first cryptographic key, and remaining word means for generating the remaining words of the second cryptographic key, the remaining word means comprising at least one word means for generating a word of the second cryptographic key based on the corresponding word, and the immediately previous word, of the first cryptographic key.

Embodiments of the apparatus can include one or more of the following features. In some embodiments, the at least one word means comprises: substitution means for generating an S-box substitution of the word immediately previous to the corresponding word of the first cryptographic key; and first exclusive-OR means for generating an exclusive-OR of the S-box substitution and the corresponding word of the first cryptographic key. In some embodiments, the at least one word means comprises: first exclusive-OR means for generating an exclusive-OR of the corresponding word, and the immediately previous word, of the first cryptographic key. In some embodiments, the first word means comprises: second exclusive-OR means for generating an exclusive-OR of the last two words of the first cryptographic key; transform means for generating a transform of the exclusive-OR of the last two words of the first cryptographic key; and third exclusive-OR means for generating an exclusive-OR of the transform and the last word of the first cryptographic key. In some embodiments, the transform means comprises: rotation means for generating a rotation of the exclusive-OR of the last two words of the first cryptographic key; substitution means for generating an S-box substitution of the rotation; and fourth exclusive-OR means for generating an exclusive-OR of the S-box substitution and a constant. In some embodiments, the rotation, S-box substitution, and constant are in compliance with the Advanced Encryption Standard (AES). Some embodiments comprise decryption means for decrypting ciphertext based on the first cryptographic key and the second cryptographic key. In some embodiments, the decryption means comprises: state means for generating a second state of the ciphertext based on a first state of the ciphertext and the first cryptographic key, and for generating a third state of the ciphertext based on the second state of the ciphertext and the second cryptographic key. In some embodiments, generating the second cryptographic key occurs after generating the second state of the ciphertext.

In general, in one aspect, an embodiment features a method comprising: receiving a first cryptographic key; and generating a second cryptographic key based on the first cryptographic key, wherein each of the first cryptographic key and the second cryptographic key comprises a plurality of words, comprising generating the first word of the second cryptographic key based on the first word of the first cryptographic key and the last two words of the first cryptographic key, and generating the remaining words of the second cryptographic key, comprising generating at least one word of the second cryptographic key based on the corresponding word, and the immediately previous word, of the first cryptographic key.

Embodiments of the method can include one or more of the following features. In some embodiments, generating at least one word of the second cryptographic key comprises: generating an S-box substitution of the word immediately previous to the corresponding word of the first cryptographic key; and generating an exclusive-OR of the S-box substitution and the corresponding word of the first cryptographic key. In some embodiments, generating at least one word of the second cryptographic key comprises: generating an exclusive-OR of the corresponding word, and the immediately previous word, of the first cryptographic key. In some embodiments, generating the first word of the second cryptographic key comprises: generating an exclusive-OR of the last two words of the first cryptographic key; generating a transform of the exclusive-OR of the last two words of the first cryptographic key; and generating an exclusive-OR of the transform and the last word of the first cryptographic key. In some embodiments, generating the transform of the exclusive-OR of the last two words of the first cryptographic key comprises: generating a rotation of the exclusive-OR of the last two words of the first cryptographic key; generating an S-box substitution of the rotation; and generating an exclusive-OR of the S-box substitution and a constant. In some embodiments, the rotation, S-box substitution, and constant are in compliance with the Advanced Encryption Standard (AES). Some embodiments comprise decrypting ciphertext based on the first cryptographic key and the second cryptographic key. In some embodiments, decrypting comprises: receiving a first state of the ciphertext; generating a second state of the ciphertext based on the first state of the ciphertext and the first cryptographic key; and generating a third state of the ciphertext based on the second state of the ciphertext and the second cryptographic key. In some embodiments, generating the second cryptographic key occurs after generating the second state of the ciphertext.

In general, in one aspect, an embodiment features a computer program executable on a processor for generating a second cryptographic key based on a first cryptographic key, wherein each of the first cryptographic key and the second cryptographic key comprises a plurality of words, the computer program comprising: instructions for generating the first word of the second cryptographic key based on the first word of the first cryptographic key and the last two words of the first cryptographic key, and instructions for generating the remaining words of the second cryptographic key, comprising instructions for generating at least one word of the second cryptographic key based on the corresponding word, and the immediately previous word, of the first cryptographic key.

Embodiments of the computer program can include one or more of the following features. In some embodiments, the instructions for generating at least one word of the second cryptographic key comprise: instructions for generating an S-box substitution of the word immediately previous to the corresponding word of the first cryptographic key; and instructions for generating an exclusive-OR of the S-box substitution and the corresponding word of the first cryptographic key. In some embodiments, the instructions for generating at least one word of the second cryptographic key comprise: instructions for generating an exclusive-OR of the corresponding word, and the immediately previous word, of the first cryptographic key. In some embodiments, the instructions for generating the first word of the second cryptographic key comprise: instructions for generating an exclusive-OR of the last two words of the first cryptographic key; instructions for generating a transform of the exclusive-OR of the last two words of the first cryptographic key; and instructions for generating an exclusive-OR of the transform and the last word of the first cryptographic key. In some embodiments, the instructions for generating the transform of the exclusive-OR of the last two words of the first cryptographic key comprise: instructions for generating a rotation of the exclusive-OR of the last two words of the first cryptographic key; instructions for generating an S-box substitution of the rotation; and instructions for generating an exclusive-OR of the S-box substitution and a constant. In some embodiments, the rotation, S-box substitution, and constant are in compliance with the Advanced Encryption Standard (AES). Some embodiments comprise instructions for decrypting ciphertext based on the first cryptographic key and the second cryptographic key. In some embodiments, decrypting comprises: instructions for generating a second state of the ciphertext based on a first state of the ciphertext and the first cryptographic key; and instructions for generating a third state of the ciphertext based on the second state of the ciphertext and the second cryptographic key. In some embodiments, generating the second cryptographic key occurs after generating the second state of the ciphertext.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Embodiments disclosed herein provide reverse key expansion techniques that can be used when decrypting ciphertext according to block ciphers. However, while described with reference to the AES standard, various embodiments can employ block and key sizes other than those specified by AES.

Figure 1:
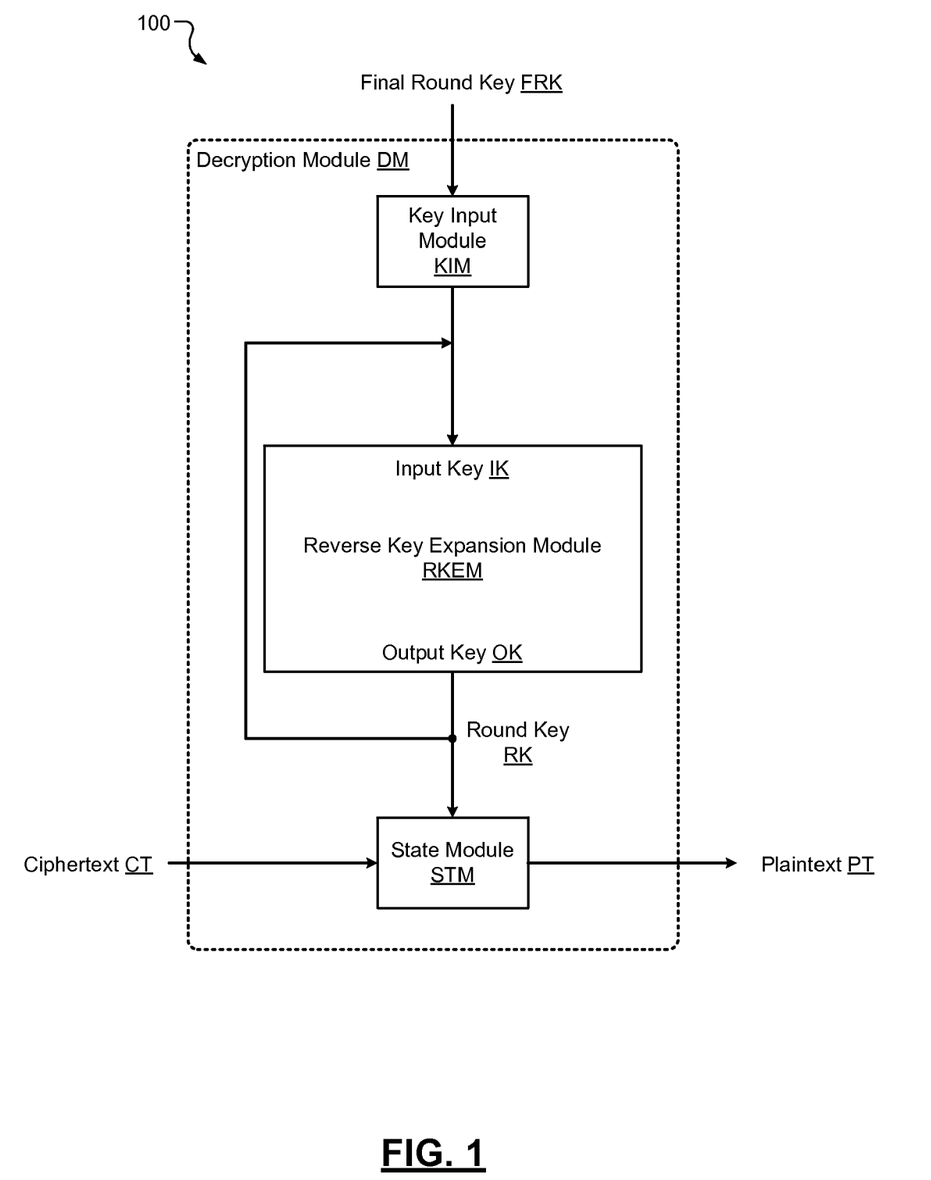
FIG. 1 shows a decryption system according to an example embodiment.

FIG. 1 shows a decryption system 100 according to an example embodiment.

Although in the described embodiments, the elements of decryption system 100 are presented in one arrangement, other arrangements are within the scope of the present invention. For example, the elements of decryption system 100 can be implemented in hardware, software, or combinations thereof. Decryption system 100 can be otherwise compliant with the AES standard.

Referring to FIG. 1, decryption system 100 includes a decryption module DM that receives ciphertext CT and a final round key FRK, and generates plaintext PT based on ciphertext CT and round key RK. Final round key FRK can be the final round key generated by conventional key expansion of a cipher key.

Decryption module DM includes a key input module KIM to receive final round key FRK, a reverse key expansion module RKEM to generate a plurality of further round keys RK based on final round key FRK, and a state module STM to generate plaintext PT based on ciphertext CT and round keys RK. Reverse key expansion module RKEM operates recursively, so that a round key RK produced by reverse key expansion module RKEM can be used as the basis for producing another round key RK.

Figure 2:
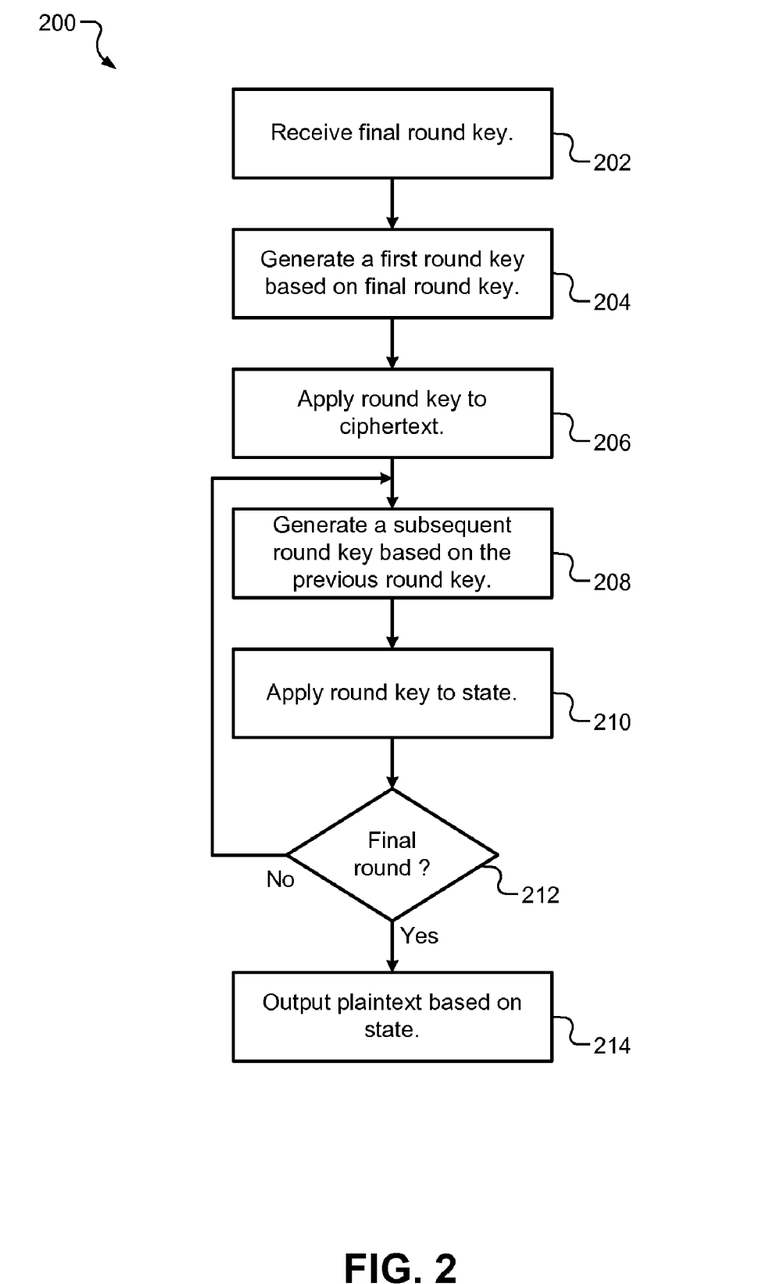
FIG. 2 shows a decryption process for the decryption system of FIG. 1 according to an example embodiment.

FIG. 2 shows a decryption process 200 for decryption system 100 of FIG. 1 according to an example embodiment. Although in the described embodiments, the elements of process 200 are presented in one arrangement, other arrangements are within the scope of the present invention. For example, in various embodiments, some or all of the steps of process 200 can be executed in a different order, concurrently, and the like. Additionally, while in process 200 each round key RK is generated after the previous round of decryption, in other embodiments all of the round keys RK can be generated before any rounds of decryption take place. Process 200 can be otherwise compliant with the AES standard.

Referring to FIG. 2, key input module KIM receives final round key FRK (step 202). Reverse Key expansion module RKEM generates a first round key RK based on final round key FRK (step 204). The first round key RK can be the same as final round key FRK. As part of the first decryption round, state module STM applies round key RK to ciphertext CT to produce a subsequent state of the ciphertext CT (step 206).

Reverse key expansion module RKEM generates a subsequent round key RK based on the previous round key RK (step 208), as described below. As part of the decryption round, state module STM applies round key RK to the current state of the ciphertext CT to produce a subsequent state (step 210). If the round is the final round (step 212), decryption module outputs plaintext PT based on the state (step 214).

Figure 3:
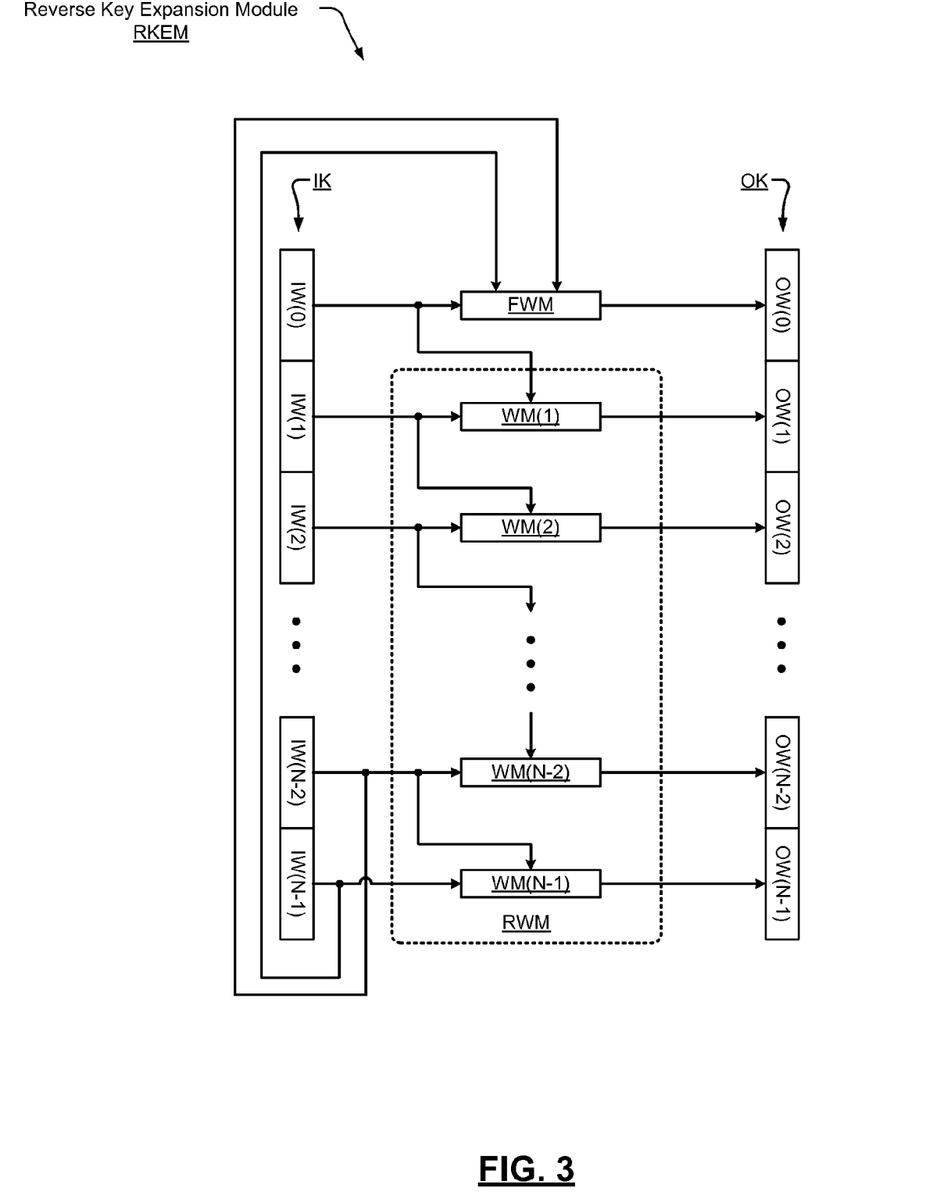
FIG. 3 shows detail of the reverse key expansion module of FIG. 1 according to an example embodiment.

FIG. 3 shows detail of reverse key expansion module RKEM according to an example embodiment. Although in the described embodiments, the elements of reverse key expansion module RKEM are presented in one arrangement, other embodiments may feature other arrangements, other arrangements are within the scope of the present invention. For example, the elements of reverse key expansion module RKEM can be implemented in hardware, software, or combinations thereof.

Referring to FIG. 3, reverse key expansion module RKEM accepts an input key IK comprising N input words IW(0)-IW(N-1), and generates an output key OK comprising N output words IW(0)-OW(N-1) based on input key IK. Input key IK can be final round key FRK in a first iteration of reverse key expansion, or can be previous round key RK produced by a previous round of reverse key expansion in subsequent iterations. In some embodiments, each word of IW and OW is 32 bits in length, and N can have the values 4, 6, or 8, for example when reverse key expansion module RKEM is used for decryption according to the AES standard.

Figure 4:
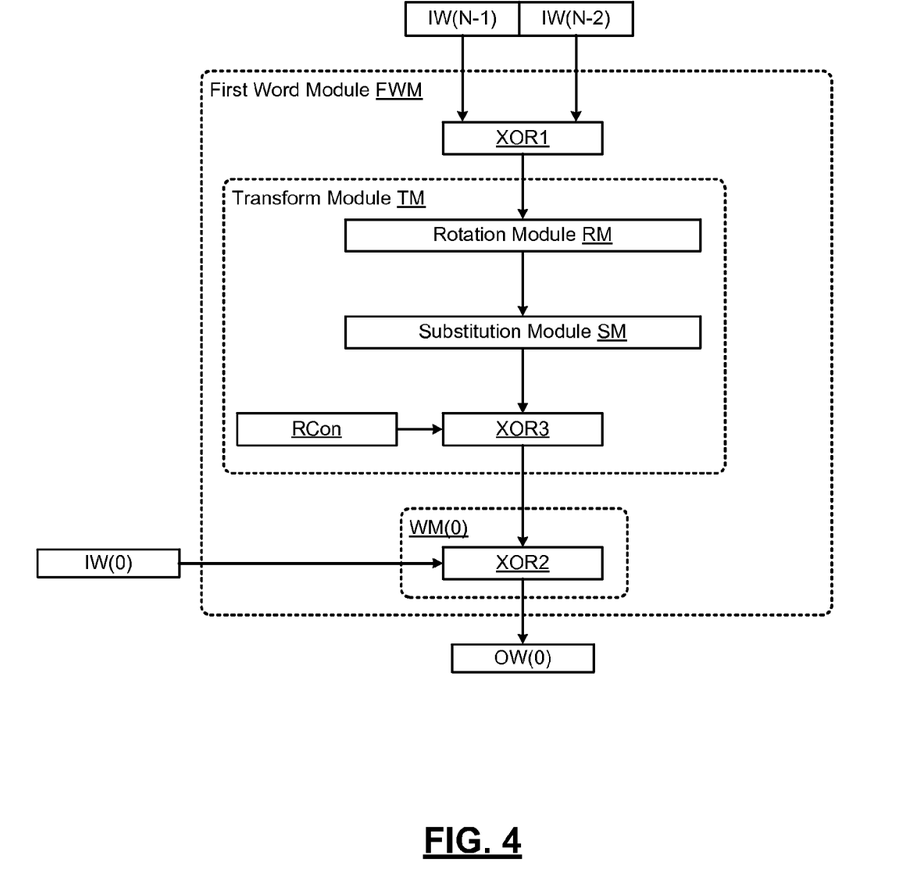
FIG. 4 shows detail of the first word module of FIG. 1 according to an example embodiment.

Reverse key expansion module RKEM includes a first word module FWM and a remaining module word RWM. First word module FWM generates the first word OW(0) of output key OK based on the first word IW(0), and last two words IW(N-2) and IW(N-1), of input key IK. FIG. 4 shows detail of first word module FWM according to an example embodiment.

Referring to FIG. 4, first word module FWM can include an exclusive-OR module XOR1 to generate an exclusive-OR (XOR) of the last two words IW(N-2) and IW(N-1) of input key IK, a transform module TM to generate a transform of the output of module XOR1, and an exclusive-OR module XOR2 to generate an exclusive-OR of the transform and the first word IW(0) of input key IK.

Transform module TM can include a rotation module RM to generate a rotation of the output of module XOR1, a substitution module SM to generate an S-box substitution of the rotation, and an exclusive-OR module XOR3 to generate an exclusive-OR of the S-box substitution and a constant RCon. In some embodiments, the rotation, S-box substitution, and constant RCon are in compliance with the Advanced Encryption Standard (AES), the content thereof incorporated by reference herein in its entirety.

Referring again to FIG. 3, remaining word module RWM includes N-1 word modules WM(1)-WM(N-1). Each word module WM generates one of output words OW based on the corresponding input word IW, and the immediately previous input word IW, of input key IK. For example, word module WM(N-1) generates output word OW(N-1) based on corresponding input word IW(N-1) and the immediately previous input word IW(N-2).

Figure 5:
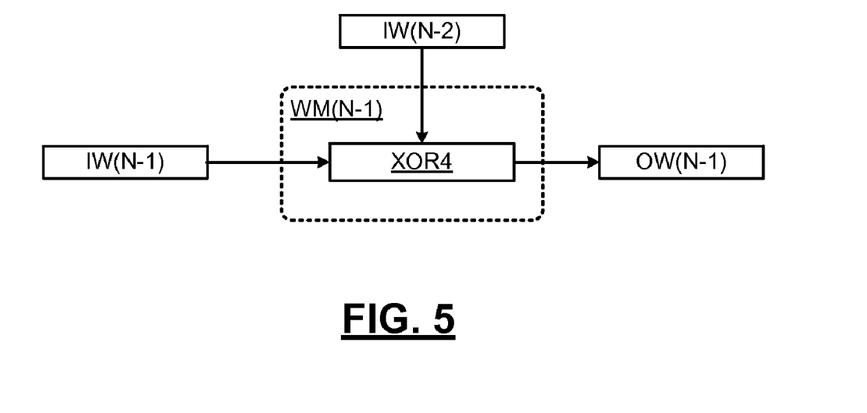
FIG. 5 shows detail of word module WM(N-1) of FIG. 1 according to an example embodiment.

FIG. 5 shows detail of word module WM(N-1) according to an example embodiment. Referring to FIG. 5, word module WM(N-1) includes an exclusive-OR module XOR4 that generates an exclusive-OR (XOR) of the received input words IW. In the above example, OW(N-1)=(IW(N-1)) XOR (IW(N-2)).

Figure 6:
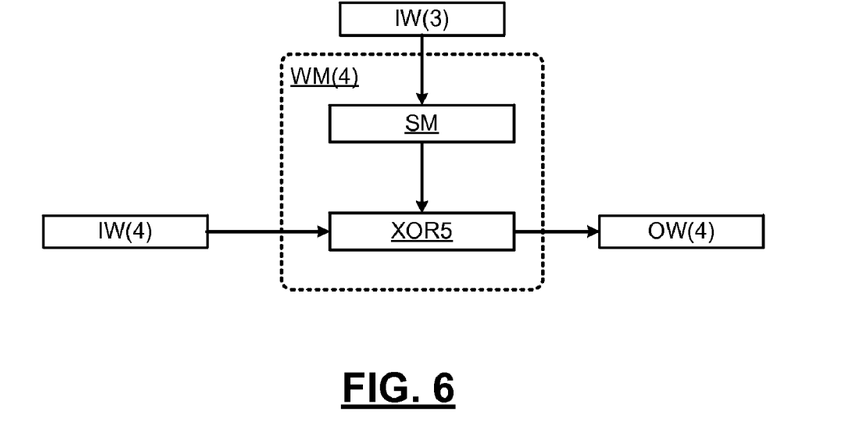
FIG. 6 shows detail of word module WM(4) of FIG. 1 according to an example embodiment.

In some embodiments, one or more word modules WM include a substitution module SM, for example when expanding keys where N>6. For example, for AES-256, N=8, so word module WM(4) includes a substitution module SM. FIG. 6 shows detail of word module WM(4) according to an example embodiment. Referring to FIG. 6, word module WM(4) includes a substitution module SM to generate an S-box substitution of the word IW(3) immediately previous to the corresponding word IW(4) of input key IK, and an exclusive-OR module XOR5 that generates an exclusive-OR (XOR) of the S-box substitution and the corresponding word IW(4) of input key IK.

Figure 7:
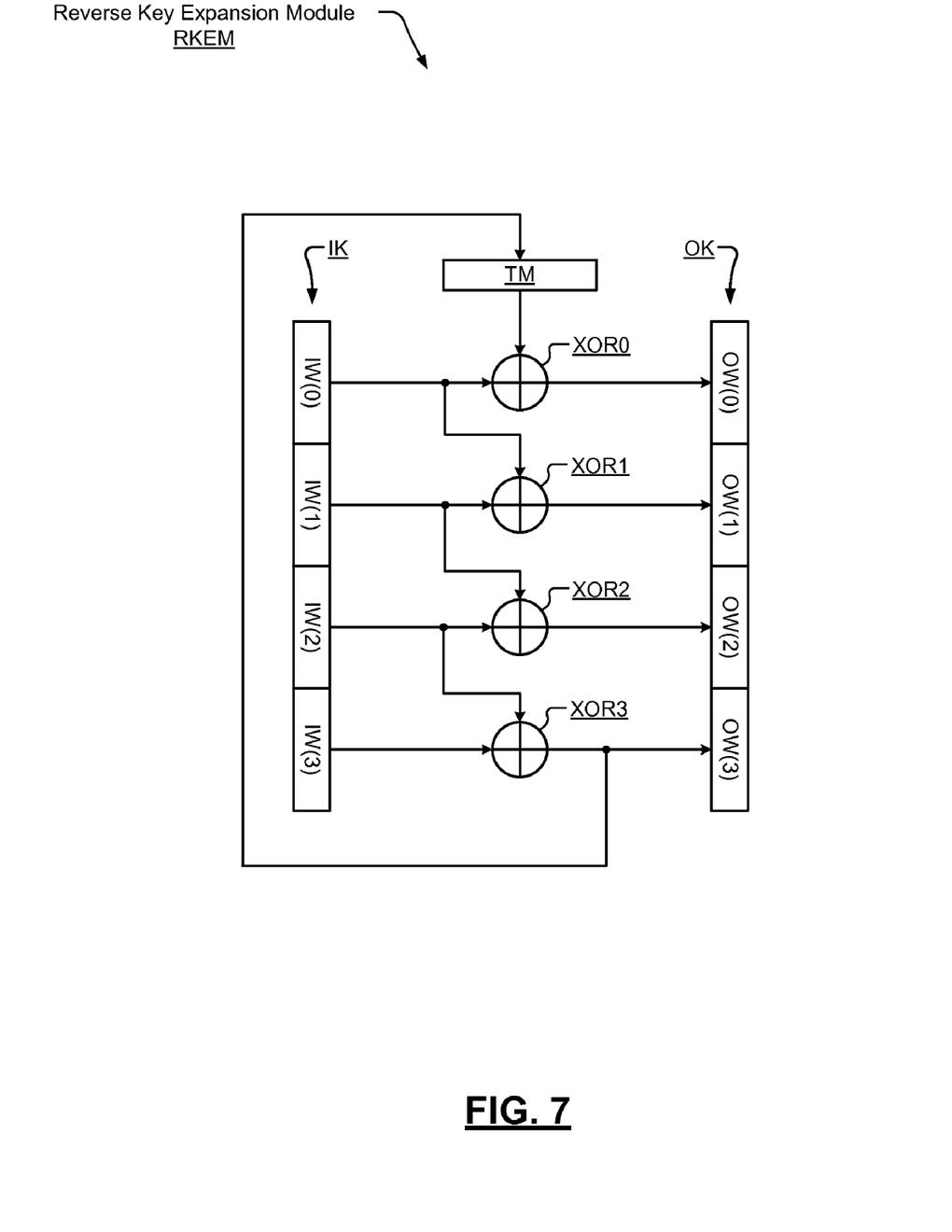
FIGS. 7-9 show example embodiments of the reverse key expansion module of FIG. 1 for use with AES-128, AES-192, and AES-256, respectively.
Figure 8:
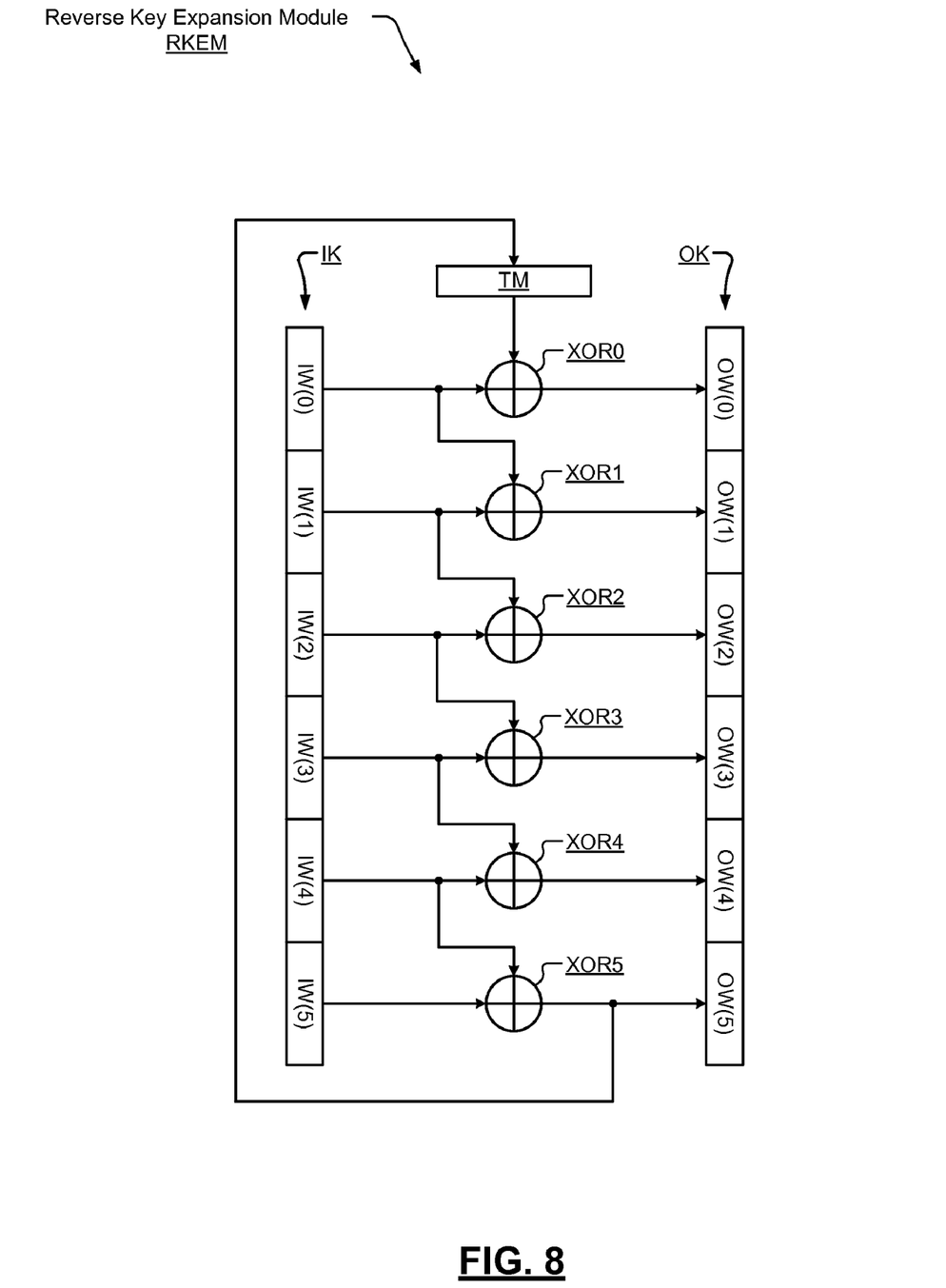
Figure 9:
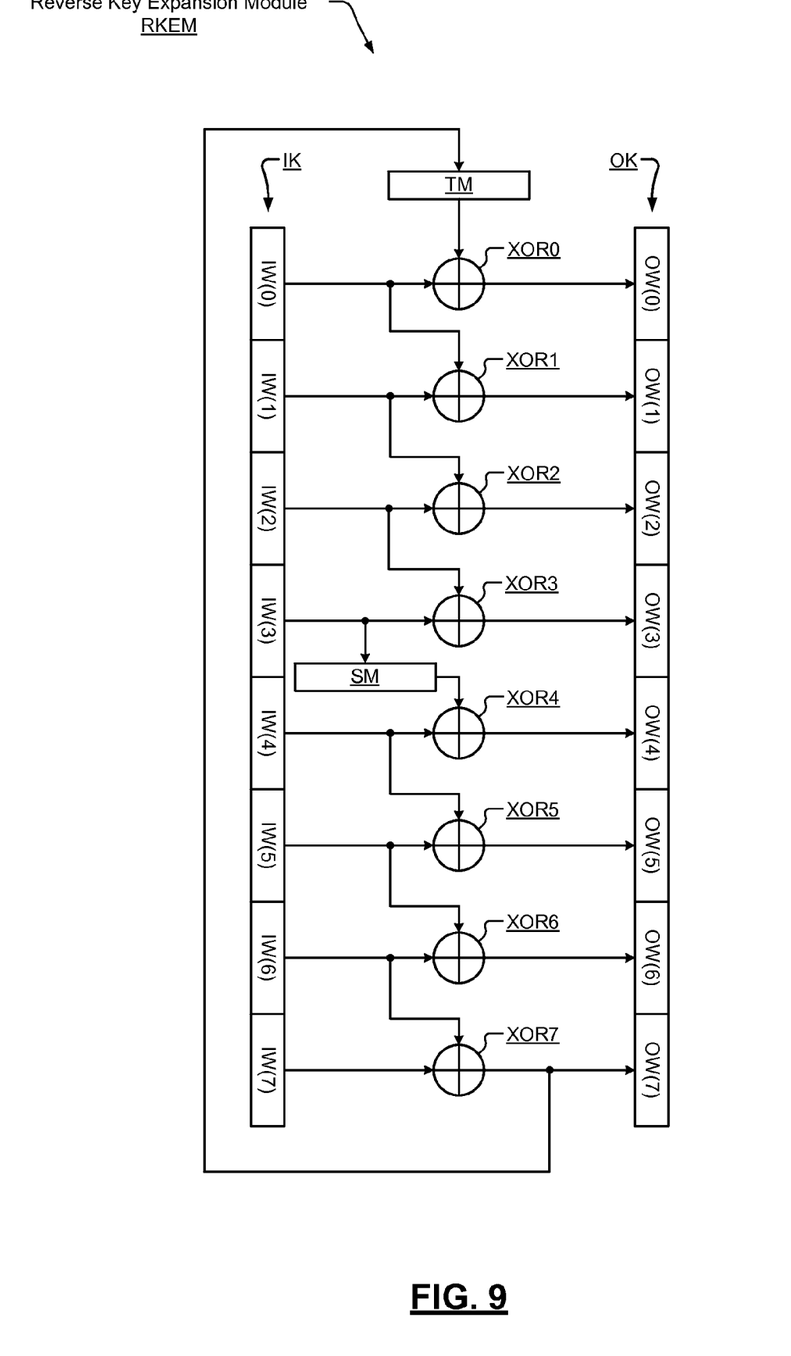

FIGS. 7-9 show example embodiments of reverse key expansion module RKEM for use with AES-128, AES-192, and AES-256, respectively. Although in the described embodiments, the elements of reverse key expansion module RKEM are presented in one arrangement, other arrangements are within the scope of the present invention. For example, the elements of reverse key expansion module RKEM can be implemented in hardware, software, or combinations thereof.

Referring to FIG. 7, under AES-128 the number of words in each key IK, OK is N=4. Therefore, four XOR modules XOR0-XOR3 are used, in addition to any used in transform module TM.

Referring to FIG. 8, under AES-192 the number of words in each key IK, OK is N=6. Therefore, six XOR modules XOR0-XOR5 are used, in addition to any used in transform module TM.

Referring to FIG. 9, under AES-256 the number of words in each key IK, OK is N=8. Therefore, eight XOR modules XOR0-XOR7 are used, in addition to any used in transform module TM. And because for AES-256 N>6, a substitution module SM is used such that OW(4)=(S-box(IW(3))) XOR (IW(4)), where the "S-box" operator denotes an S-box substitution.

Some embodiments include computer programs executable on a processor. Pseudocode instructions for one embodiment are presented below, where byte is 8 bits, word is 32 bits, Nk is key length in words, Nb is the AES block length in words (128 bits is 4 words), Nr is the number of rounds of AES, key is given last Nk round keys, and w is expanded round keys.

```
ReverseKeyExpansion(byte key[4*Nk], word w[Nb*(Nr+1)], Nk)
  begin
    word temp
    // Copy given Key
    i=Nb*(Nr+1)-Nk
    while (i<(Nb*(Nr+1)))
      j=i-((Nb*(Nr+1)-Nk)
      w[i]=word(key[4*j], key[4*j+1], key[4*j+2], key[4*j+3])
      i=i+1
    end while
    // Generate all the round keys
    i=Nb*(Nr+1)-Nk-1
    while (i+1>0)
      temp=w[i+Nk-1]
      if ((i+Nk) mod Nk=0)
        temp=w[i+Nk-1] xor w[i+Nk-2]
        temp=SubWord(RotWord(temp)) xor Rcon[(i+Nk)/Nk]
      else if (Nk>6 and (i+Nk) mod Nk=4)
        temp=SubWord(temp)
      end if
      w[i]=w[i+Nk] xor temp
      i=i-1
    end while
  end
```

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the scope of the invention. Accordingly, other implementations are within the scope of the following claims.

What is claimed is:

1. An apparatus comprising:
a key input circuit configured to receive a first cryptographic key; and
a reverse key expansion circuit configured to generate a second cryptographic key based on the first cryptographic key, wherein each of the first cryptographic key and the second cryptographic key comprises a plurality of words, and wherein the reverse key expansion circuit comprises
a first word circuit configured to generate the first word of the second cryptographic key based on i) the first word of the first cryptographic key and ii) the last two words of the first cryptographic key, and
a remaining word circuit configured to generate the remaining words of the second cryptographic key, the remaining word circuit comprising at least one word circuit configured to generate a word of the second cryptographic key based on the corresponding word, and the immediately previous word, of the first cryptographic key, wherein the at least one word circuit comprises a first exclusive-OR circuit configured to generate an exclusive-OR of the corresponding word, and the immediately previous word, of the first cryptographic key.

2. The apparatus of claim 1, wherein the remaining word circuit comprises another word circuit comprising:

a substitution circuit configured to generate an S-box substitution of the word immediately previous to a word of the first cryptographic key corresponding to the another word circuit; and an exclusive-OR circuit configured to generate an exclusive-OR of the S-box substitution and the corresponding word of the first cryptographic key.

3. The apparatus of claim 2, wherein the first word circuit comprises:

a second exclusive-OR circuit configured to generate an exclusive-OR of the last two words of the first cryptographic key;

a transform circuit configured to generate a transform of the exclusive-OR of the last two words of the first cryptographic key; and a third exclusive-OR circuit configured to generate an exclusive-OR of the transform and the last word of the first cryptographic key.

4. The apparatus of claim 3, wherein the transform circuit comprises:

a rotation circuit configured to generate a rotation of the exclusive-OR of the last two words of the first cryptographic key;

a substitution circuit configured to generate an S-box substitution of the rotation; and a fourth exclusive-OR circuit configured to generate an exclusive-OR of the S-box substitution and a constant.

5. The apparatus of claim 4:

wherein the rotation, S-box substitution, and constant are in compliance with the Advanced Encryption Standard (AES).

6. The apparatus of claim 1, further comprising:

a decryption circuit configured to decrypt ciphertext based on the first cryptographic key and the second cryptographic key.

7. The apparatus of claim 6, wherein the decryption module circuit comprises:

a state circuit configured to generate a second state of the ciphertext based on a first state of the ciphertext and the first cryptographic key, and to generate a third state of the ciphertext based on the second state of the ciphertext and the second cryptographic key.

8. The apparatus of claim 7:

wherein generating the second cryptographic key occurs after generating the second state of the ciphertext.

9. A method comprising:

receiving a first cryptographic key; and generating a second cryptographic key based on the first cryptographic key, wherein each of the first cryptographic key and the second cryptographic key comprises a plurality of word, and wherein generating the second cryptographic key comprises generating the first word of the second cryptographic key based on i) the first word of the first cryptographic key and ii) the last two words of the first cryptographic key, and generating the remaining words of the second cryptographic key, comprising generating at least one word of the second cryptographic key based on the corresponding word, and the immediately previous word, of the first cryptographic key, wherein generating at least one word of the second cryptographic key comprises generating an exclusive-OR of the corresponding word, and the immediately previous word, of the first cryptographic key.

10. The method of claim 9, wherein generating the remaining words of the second cryptographic key further comprises:

generating an S-box substitution of the word immediately previous to a corresponding word of the first cryptographic key; and generating an exclusive-OR of the S-box substitution and the corresponding word of the first cryptographic key.

11. The method of claim 10, wherein generating the first word of the second cryptographic key comprises:

generating an exclusive-OR of the last two words of the first cryptographic key;

generating a transform of the exclusive-OR of the last two words of the first cryptographic key; and generating an exclusive-OR of the transform and the last word of the first cryptographic key.

12. The method of claim 11, wherein generating the transform of the exclusive-OR of the last two words of the first cryptographic key comprises:

generating a rotation of the exclusive-OR of the last two words of the first cryptographic key;

generating an S-box substitution of the rotation; and generating an exclusive-OR of the S-box substitution and a constant.

13. The method of claim 12:

wherein the rotation, S-box substitution, and constant are in compliance with the Advanced Encryption Standard (AES).

14. The method of claim 9, further comprising:

decrypting ciphertext based on the first cryptographic key and the second cryptographic key.

15. The method of claim 14, wherein decrypting comprises:

receiving a first state of the ciphertext;

generating a second state of the ciphertext based on the first state of the ciphertext and the first cryptographic key; and generating a third state of the ciphertext based on the second state of the ciphertext and the second cryptographic key.

16. The method of claim 15:

wherein generating the second cryptographic key occurs after generating the second state of the ciphertext.

17. A computer program stored on a non-transitory tangible computer-readable medium and executable on a processor for generating a second cryptographic key based on a first cryptographic key, wherein each of the first cryptographic key and the second cryptographic key comprises a plurality of words, the computer program comprising:

instructions for generating the first word of the second cryptographic key based on i) the first word of the first cryptographic key and ii) the last two words of the cryptographic key, and instructions for generating the remaining words of the second cryptographic key, comprising instructions for generating at least one word of the second cryptographic key based on the corresponding word, and the immediately previous word, of the first cryptographic key, wherein the instructions for generating at least one word of the second cryptographic key comprise instructions for generating an exclusive-OR of the corresponding word, and the immediately previous word, of the first cryptographic key.

18. The computer program of claim 17, wherein the instructions for generating the remaining words of the second cryptographic key further comprise:
   instructions for generating an S-box substitution of the word immediately previous to a corresponding word of the first cryptographic key; and
   instructions for generating an exclusive-OR of the S-box substitution and the corresponding word of the first cryptographic key.

19. The computer program of claim 18, wherein the instructions for generating the first word of the second cryptographic key comprise:
   instructions for generating an exclusive-OR of the last two words of the first cryptographic key;
   instructions for generating a transform of the exclusive-OR of the last two words of the first cryptographic key; and
   instructions for generating an exclusive-OR of the transform and the last word of the first cryptographic key.

20. The computer program of claim 19, wherein the instructions for generating the transform of the exclusive-OR of the last two words of the first cryptographic key comprise:
   instructions for generating a rotation of the exclusive-OR of the last two words of the first cryptographic key;
   instructions for generating an S-box substitution of the rotation; and
   instructions for generating an exclusive-OR of the S-box substitution and a constant.

21. The computer program of claim 20:
   wherein the rotation, S-box substitution, and constant are in compliance with the Advanced Encryption Standard (AES).

22. The computer program of claim 17, further comprising:
   instructions for decrypting ciphertext based on the first cryptographic key and the second cryptographic key.

23. The computer program of claim 22, wherein decrypting comprises:
   instructions for generating a second state of the ciphertext based on a first state of the ciphertext and the first cryptographic key; and
   instructions for generating a third state of the ciphertext based on the second state of the ciphertext and the second cryptographic key.

24. The computer program of claim 23:
   wherein generating the second cryptographic key occurs after generating the second state of the ciphertext.

* * * * *